United States Patent
Yuan et al.

(10) Patent No.: US 12,492,745 B2
(45) Date of Patent: Dec. 9, 2025

(54) SPEED REDUCER, POWERTRAIN, AND VEHICLE

(71) Applicant: XIAOMI EV TECHNOLOGY CO., LTD., Beijing (CN)

(72) Inventors: Feng Yuan, Beijing (CN); Lier Xie, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/620,723

(22) Filed: Mar. 28, 2024

(65) Prior Publication Data

US 2025/0035207 A1 Jan. 30, 2025

(30) Foreign Application Priority Data

Jul. 27, 2023 (CN) .......................... 202310936586.1

(51) Int. Cl.
*F16H 57/04* (2010.01)

(52) U.S. Cl.
CPC ................................ *F16H 57/0424* (2013.01)

(58) Field of Classification Search
CPC ............... F16H 57/0424; F16H 57/027; F16H 57/0404; F16H 57/0423; F16H 57/0435; F16H 57/0436; F16H 57/0443; F16H 57/0453; F16H 57/0456; F16H 57/046; F16H 57/0471; F16H 57/045; F16H 57/0412; F16H 1/20
See application file for complete search history.

(56) References Cited

U.S. PATENT DOCUMENTS

| | | | |
|---|---|---|---|
| 10,746,282 B2 | 8/2020 | Ito et al. | |
| 2003/0098204 A1* | 5/2003 | Mogi | F16H 57/027 184/6.23 |
| 2006/0048600 A1* | 3/2006 | Taguchi | F16H 57/0483 74/607 |
| 2013/0145879 A1* | 6/2013 | Nakamura | F16H 57/0441 74/467 |
| 2015/0285368 A1* | 10/2015 | Mclauchlan | F16H 57/046 184/6.12 |
| 2017/0276036 A1* | 9/2017 | Mukohara | F16H 57/0432 |
| 2020/0208733 A1* | 7/2020 | Kim | F16H 57/02 |
| 2022/0025968 A1* | 1/2022 | Leloup | F16H 57/0457 |

(Continued)

FOREIGN PATENT DOCUMENTS

CN 112780757 A 5/2021
EP 2602515 A1 6/2013

OTHER PUBLICATIONS

Machine translation of CN 112780757 A (Year: 2021).*
European Patent Application No. 24166485.3, Search Report and Opinion dated Sep. 3, 2024, 9 pages.

*Primary Examiner* — Farhana Pervin
(74) *Attorney, Agent, or Firm* — Cozen O'Connor

(57) ABSTRACT

A speed reducer includes a housing, a partition plate, and a reduction assembly. The housing defines a chamber and an oil passage. The partition plate is arranged in the housing to separate the chamber into a gear chamber and an oil chamber. The reduction assembly is arranged in the gear chamber, and the oil passage has an inlet in communication with the oil chamber and an outlet in communication with the gear chamber, and the outlet of the oil passage faces towards the reduction assembly to lubricate the reduction assembly.

14 Claims, 2 Drawing Sheets

(56) References Cited

U.S. PATENT DOCUMENTS

| | | | |
|---|---|---|---|
| 2022/0260153 A1* | 8/2022 | Lutz | F16H 57/0435 |
| 2023/0027025 A1* | 1/2023 | Shelton | F16H 57/0441 |
| 2023/0146341 A1* | 5/2023 | Nakawatari | F16H 57/0412 |
| | | | 180/339 |
| 2024/0392877 A1* | 11/2024 | Nakajima | F16H 57/0457 |

\* cited by examiner

SPEED REDUCER, POWERTRAIN, AND VEHICLE

CROSS-REFERENCE TO RELATED APPLICATIONS

The present application claims the benefit of priority to Chinese Application No. 202310936586.1, filed on Jul. 27, 2023, the contents of which are incorporated herein by reference in their entireties for all purposes.

BACKGROUND

With the continuous development of new energy vehicles and the gradual increase of market demand for new energy vehicles with a greater drive capacity, drive motors of the new energy vehicles continue to be improved in terms of speed, torque density and power density.

SUMMARY

The present disclosure relates to the field of vehicles, and more particularly to a speed reducer, a powertrain, and a vehicle.

A speed reducer according to embodiments of the present disclosure includes a housing, a partition plate, and a reduction assembly. The housing defines a chamber and an oil passage. The partition plate is arranged in the housing to separate the chamber into a gear chamber and an oil chamber. The reduction assembly is arranged in the gear chamber. The oil passage has an inlet in communication with the oil chamber and an outlet in communication with the gear chamber. The outlet of the oil passage faces towards the reduction assembly to lubricate the reduction assembly.

A powertrain according to embodiments of the present disclosure includes a speed reducer according to any one of the above embodiments.

A vehicle according to embodiments of the present disclosure includes a powertrain according to the above embodiments or a speed reducer according to any one of the above embodiments.

DETAILED DESCRIPTION

Embodiments of the present disclosure are described in detail below, examples of which are shown in the accompanying drawings. The following embodiments described with reference to the accompanying drawing are illustrative. It should be understood that the embodiments described are intended to explain the present disclosure, but not to limit the present disclosure.

In related art, speed reducer systems face increasing challenges, with more lubrication and cooling requirements for bearings and gears. Speed reducers in the related art adopt a splash lubrication method, which utilizes the gear to stir lubricating oil at a high speed in an oil sump of the speed reducers and drives the oil to splash inside the speed reducer to lubricate the gear. However, the splash lubrication method requires the lubricating oil to reach a certain level for immersion of the gear such that the lubricating oil may be ejected, which requires a large total amount of lubricating oil. Furthermore, when a vehicle encounters uphill and downhill terrain and is under conditions of acceleration and deceleration, a level of the lubricating oil is uncontrollable, which is prone to causing a large churning loss, unstable lubrication and so on.

The present disclosure is intended to solve at least one of the problems existing in the related art to at least some extent. Accordingly, embodiments of the present disclosure propose a speed reducer, which can avoid the loss of lubricating oil and enhance lubrication stability.

Figure 1:
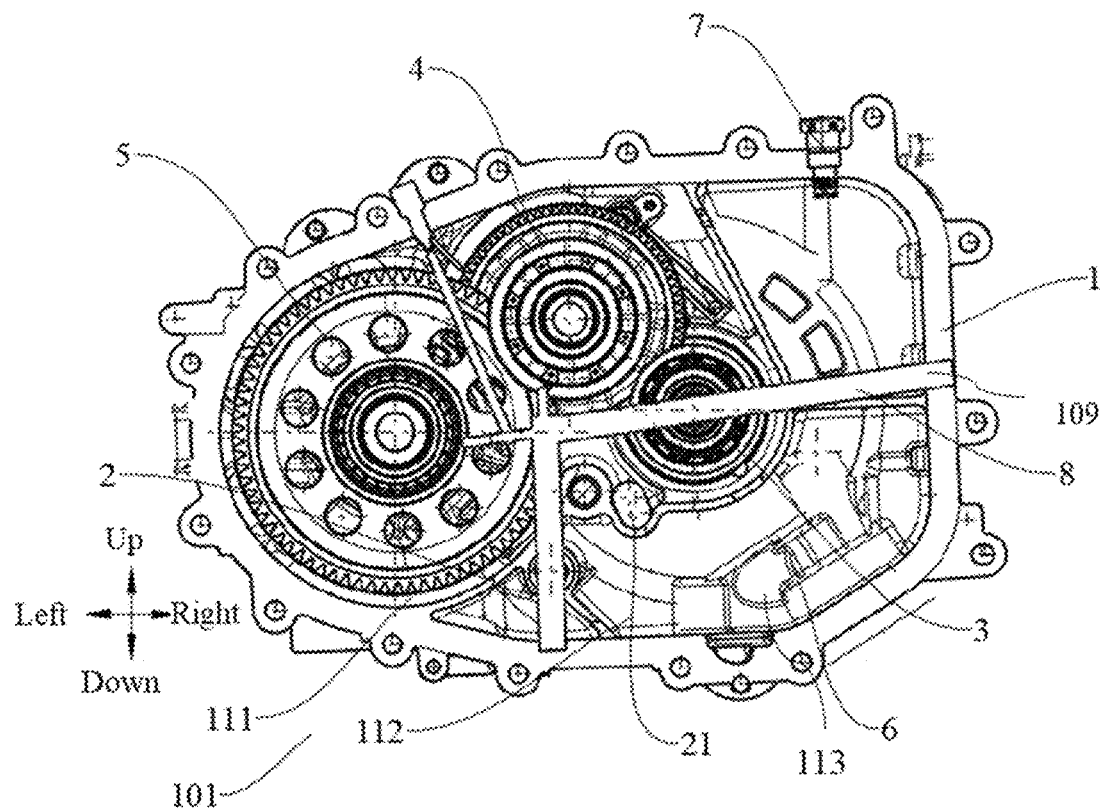
FIG. 1 is a structural schematic diagram of a speed reducer according to an embodiment of the present disclosure.
Figure 2:
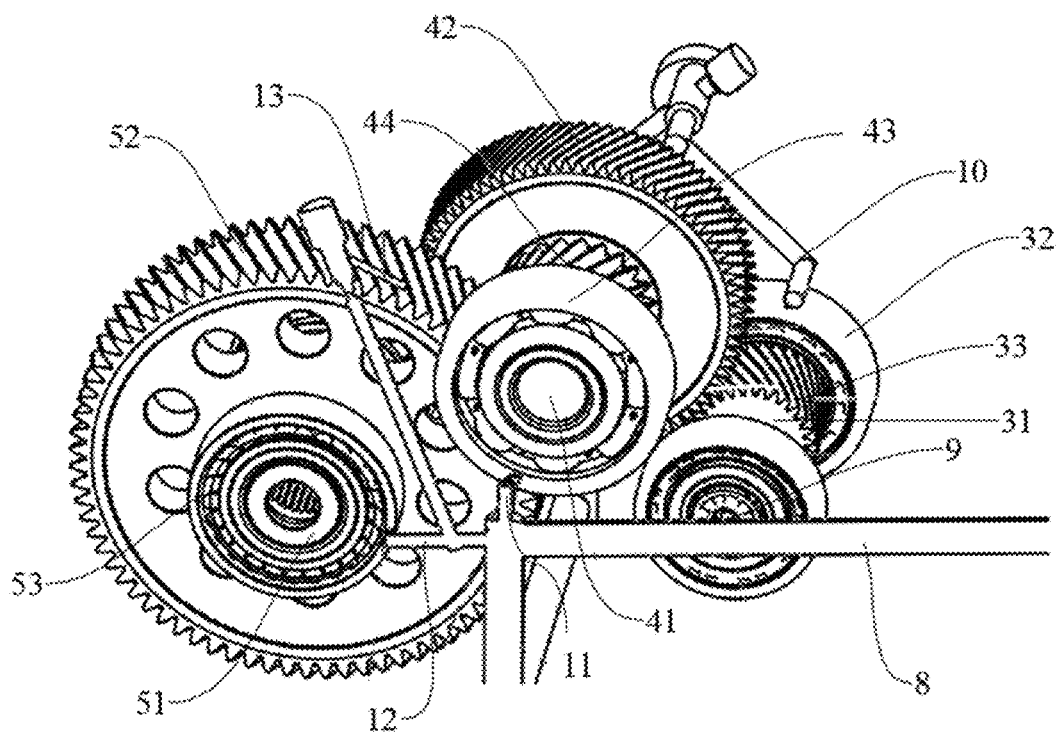
FIG. 2 is a front view of a speed reducer according to an embodiment of the present disclosure.
Figure 3:
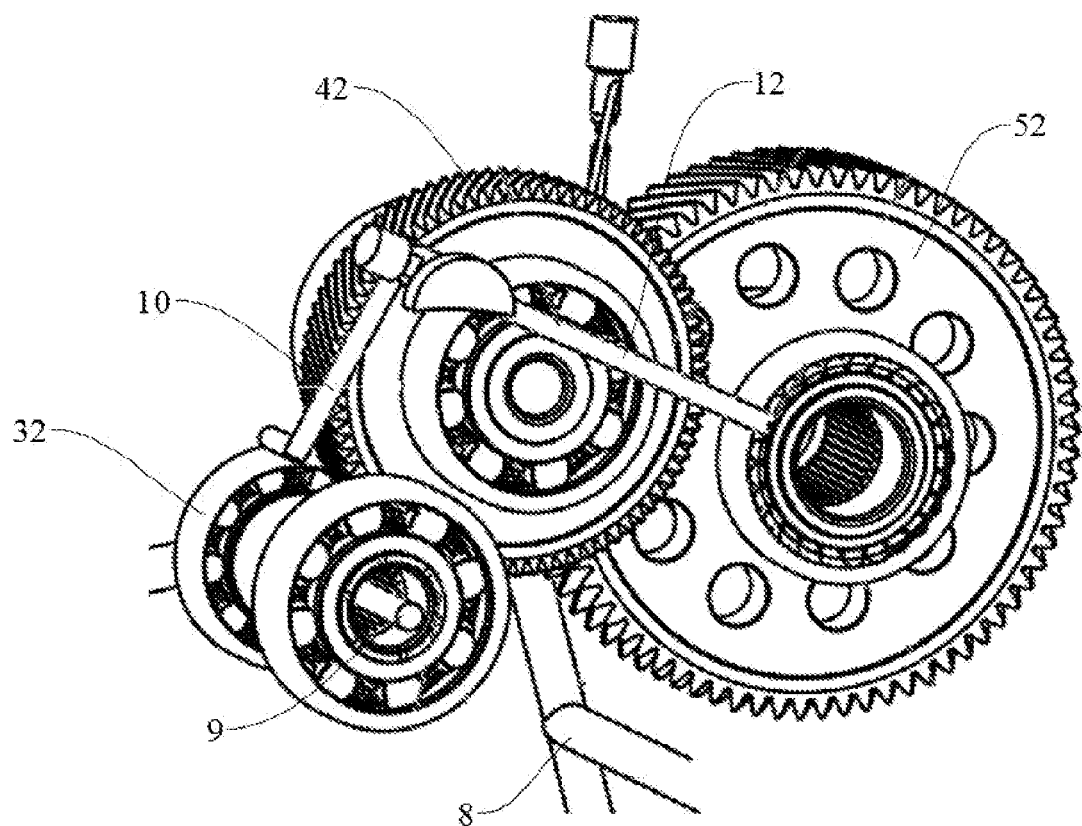
FIG. 3 is a rear view of a speed reducer according to an embodiment of the present disclosure.

As illustrated in FIGS. 1 to 3, a speed reducer according to embodiments of the present disclosure includes a housing 1, a partition plate 2, and a reduction assembly. The housing 1 defines a chamber 101 and an oil passage. The partition plate 2 is arranged in the housing 1 to separate the chamber 101 into a gear chamber 111 and an oil chamber 112. The reduction assembly is arranged in the gear chamber 111. The oil passage has an inlet in communication with the oil chamber 112 and an outlet in communication with the gear chamber 111, and the outlet of the oil passage faces towards the reduction assembly to lubricate the reduction assembly.

Specifically, as illustrated in FIGS. 1 and 2, the partition plate 2 is arranged in the housing 1, the partition plate 2 separates the chamber 101 inside the housing 1 into the gear chamber 111 and the oil chamber 112, the gear chamber 111 is located above the oil chamber 112, and the oil passage is defined in the housing 1. It should be noted that the housing 1 includes two detachable sub-housings 1, each of the two sub-housings 1 defines a groove 109, and the grooves 109 in the two sub-housings 1 enclose the oil passage. The inlet of the oil passage is in communication with the oil chamber 112, and the outlet of the oil passage faces towards the reduction assembly and sprays lubricating oil to the reduction assembly through the oil passage.

The speed reducer according to embodiments of the present disclosure uses the partition plate 2 to separate an interior of the housing 1 into the gear chamber 111 and the oil chamber 112 independent of each other, thereby avoiding the loss of lubricating oil due to splash lubrication and ensuring the suction stability of an oil pump; and uses the oil passage to spray the lubricating oil to the reduction assembly, changing a passive lubrication method of splash lubrication to an active lubrication, which improves the lubrication performance of the reduction assembly and enhances lubrication stability. Moreover, due to separation of the oil chamber 112 and the gear chamber 111, the lubricating oil can still be delivered to the reduction assembly through the oil passage when a vehicle is moving uphill and downhill or tilting left and right.

In some embodiments, the reduction assembly includes an input component 3, a transmission component 4 and an output component 5. The input component 3, the transmission component 4, and the output component 5 are arranged at intervals in a length direction of the housing 1. The oil passage includes a main oil passage 8 and a plurality of branch oil passages, the plurality of branch oil passages has inlets in communication with the main oil passage 8 and outlets respectively facing towards the input component 3, the transmission component 4 and the output component 5 to deliver the lubricating oil to the reduction assembly.

Specifically, as illustrated in FIG. 1, the input component 3, the transmission component 4, and the output component 5 are arranged sequentially from right to left, a power input end of the input component 3 is connected to a power source, and a power output end of the output component 5 is connected to a drive shaft. The outlets of the plurality of branch oil passages face towards the input component 3, the transmission part 4 and the output component 5, respectively. It should be noted that, the branch oil passages can have different oil discharge capacities. For example, the outlets of the branch oil passages define flow limiting holes, and a size of the flow limiting hole of each branch oil passage can be different. For example, suitable size of the flow limiting hole is selected according to calibration of the input component 3, the transmission component 4 and the output component 5. By arranging the plurality of branch oil passages, the amount of oil sprayed on each component of the reduction assembly can be adjusted according to the operating condition of the vehicle and speed reducer performance calibration, which can not only improve the utilization rate of lubricating oil, but also enable the speed reducer to operate in an optimal lubrication and efficiency range.

In some embodiments, the reduction assembly includes the input component 3, the input component 3 includes an input shaft 31 and two input bearings 32, the two input bearings 32 are sleeved on the input shaft 31, and the two input bearings 32 are respectively located at two ends of the input shaft 31. The branch oil passages include a first branch 9, and the first branch 9 has an outlet facing towards the two input bearings 32.

Specifically, as illustrated in FIG. 1, the two input bearings 32 are located on a front side and a rear side of the input shaft 31, respectively. The first branch 9 located on the front side sprays the lubricating oil to the input bearing 32 on the front side, while the first branch 9 located on the rear side sprays the lubricating oil to the input bearing 32 on the rear side, and the lubricating oil can be sprayed onto the input bearings 32 on the front side and the rear side of the input shaft 31 through the first branches 9, which can improve the lubrication of the bearings on a power input side. It should be noted that the sizes of the flow limiting holes of the first branches 9 on the front side and the rear side can be the same or different. For example, the sizes of the flow limiting holes on the front side and the rear side can be adjusted according to a calibration parameter of the input bearings 32 on the front and rear sides or the operating condition of the vehicle, which can not only finely control the amount of lubricating oil to improve the use efficiency of lubricating oil, but also improve the performance of the speed reducer.

In some embodiments, the transmission component 4 includes a transmission shaft 41, a first transmission gear 42, and two transmission bearings 43. The two transmission bearings 43 and the first transmission gear 42 are sleeved on the transmission shaft 41, the two transmission bearings 43 are respectively located at two ends of the transmission shaft 41, and the first transmission gear 42 is located between the two transmission bearings 43. The input component 3 includes an input gear 33, and the input gear 33 is engaged with the first transmission gear 42. The branch oil passages further include a second branch 10 and a third branch 11, the second branch 10 has an outlet facing towards the input gear 33, and the third branch 11 has an outlet facing towards the two transmission bearings 43.

Specifically, as illustrated in FIGS. 2 and 3, the transmission shaft 41 and the input shaft 31 are arranged at intervals in a left-right direction, and the transmission shaft 41 and the input shaft 31 are arranged in parallel. The two transmission bearings 43 are arranged opposite in a front-rear direction of the transmission shaft 41, the first transmission gear 42 is located between the two transmission bearings 43, and the first transmission gear 42 is engaged with the input gear 33. The outlet of the second branch 10 faces towards the input gear 33, the outlet of the third branch 11 on the front side sprays the lubricating oil towards the transmission bearing 43 on the front side, while the outlet of the third branch 11 on the rear side sprays the lubricating oil towards the transmission bearing 43 on the rear side. Through the second branch 10, a first stage gear, namely the first transmission gear 42 and the input gear 33, is lubricated, improving operational stability and service life of the speed reducer.

It should be noted that the sizes of the flow limiting holes of the third branches 11 on the front side and the rear side can be the same or different. For example, the sizes of the flow limiting holes on the front side and the rear side can be adjusted according to a calibration parameter of the transmission bearings 43 on the front and rear sides or the operating condition of the vehicle, which can not only finely control the amount of lubricating oil to improve the use efficiency of lubricating oil, but also improve the performance of the speed reducer.

In some embodiments, the output component 5 includes an output shaft 51, an output gear 52, and two output bearings 53. The two output bearings 53 and the output gear 52 are sleeved on the output shaft 51, the two output bearings 53 are respectively located at two ends of the output shaft 51, and the output gear 52 is located between the two output bearings 53. The transmission component 4 further includes a second transmission gear 44, and the output gear 52 is engaged with the second transmission gear 44. The branch oil passages further include a fourth branch 12 and a fifth branch 13, the fourth branch 12 has an outlet facing towards the two output bearings 53, and the fifth branch 13 has an outlet facing towards the output gear 53.

Specifically, as illustrated in FIGS. 2 and 3, the transmission shaft 41 and the output shaft 51 are arranged at intervals in the left-right direction, and the transmission shaft 41 and the output shaft 51 are arranged in parallel. The two output bearings 53 are arranged opposite in a front-rear direction of the output shaft 51, the second transmission gear 44 and the first transmission gear 42 are arranged at intervals in an axial direction of the transmission shaft 41, the second transmission gear 44 is engaged with the output gear 52, and the outlet of the fifth branch 13 faces towards the output gear 52. Thus, a second stage gear, namely the second transmission gear 44 and the output gear 52, is lubricated.

The outlet of the fourth branch 12 on the front side sprays the lubricating oil towards the output bearing 53 on the front side, while the outlet of the fourth branch 12 on the rear side sprays the lubricating oil towards the output bearing 53 on the rear side.

It should be noted that the sizes of the flow limiting holes of the fourth branches 12 on the front side and the rear side can be the same or different. For example, the sizes of the flow limiting holes on the front side and the rear side can be adjusted according to an calibration parameter of the output bearings 53 on the front and rear sides or the operating condition of the vehicle, which can not only finely control the amount of lubricating oil to improve the efficiency of lubricating oil use, but also improve the performance of the speed reducer.

Optionally, there is a preset distance between the partition plate 2 on a left side and the output gear 52, which not only ensures rotation smoothness of the output gear 52, but also reduces the amount of oil stirred by the output gear 52.

In some embodiments, the speed reducer further includes an oil scavenge pump 6. The oil scavenge pump 6 is arranged in the oil chamber 112, the partition plate 2 defines an oil discharge port 21, and the housing 1 further defines an oil collection chamber 113. The oil collection chamber 113 has an inlet in communication with the oil discharge port 21 and an outlet in communication with the oil scavenge pump 6.

Specifically, as illustrated in FIG. 1, the oil discharge port 21 is in communication with the oil collection chamber 113, the oil scavenge pump 6 is located in the oil chamber 112, and the oil scavenge pump 6 sucks the lubricating oil from the oil collection chamber 113 into the oil chamber 112, achieving recovery of lubricating oil inside the gear chamber 111 and improving the use efficiency of lubricating oil.

The lubricating oil on a right side of the output gear 52 is discharged through the oil discharge port 21.

As illustrated in FIG. 1, a height of the partition plate 2 on a right side is higher than a height of the oil discharge port 21, while a height of the partition plate 2 on the left side is lower than the height of the oil discharge port 21. Therefore, a sufficiently high oil difference between the partition plate 2 on the right side and the output gear 52 cannot be established, thereby reducing the amount of oil stirred by the gear. Furthermore, the lubricating oil on the right side flows into the oil discharge port 21 under the action of gravity, and the amount of oil stirred by the input gear 33 and the transmission gear is reduce, reducing the churning loss of the speed reducer.

In some embodiments, the speed reducer further includes an oil supply pump, an oil cooler and a filter connected in sequence, and the oil supply pump has an outlet in communication with the main oil passage 8 and an inlet in communication with the oil chamber 112.

It should be noted that the inlet of the oil supply pump is in communication with the oil chamber 112, the outlet of the oil supply pump is in communication with an inlet of the oil cooler, an outlet of the oil cooler is in communication with an inlet of the filter, and an outlet of the filter is in communication with the main oil passage 8. The lubricating oil can be cleaner by passing through the oil cooler and the filter, and the temperature of the lubricating oil can be adjusted, improving the lubrication effect on the gears and the bearings and the service life and performance of the speed reducer.

Furthermore, due to the presence of the partition plate 2, the evacuation rate of the oil supply pump can be reduced, and the NVH performance and reliability of the oil supply pump can be improved.

In some embodiments, the speed reducer further includes a ventilation plug 7. The ventilation plug 7 is connected to the housing 1, the ventilation plug 7 is located in the oil chamber 112, and the ventilation plug 7 has an installation height greater than a liquid level height inside the oil chamber 112.

Specifically, as illustrated in FIG. 1, the ventilation plug 7 is located above the oil chamber 112, and a lower end of the ventilation plug 7 extends into the oil chamber 112. It should be noted that the ventilation plug 7 is located at a highest point of the oil chamber 112. For example, to ensure IP67/69K protection capability, the ventilation plug 7 adopts a normally closed breathable film ventilation plug. Due to non-oil resistance of a breathable film of the ventilation plug 7, the ventilation plug 7 will be blocked when the lubricating oil covers the breathable film. When the vehicle is driving at a high speed, the partition plate 2 is used to separate the gear chamber 111 and the oil chamber 112, which can prevent the splashing lubricating oil from impacting the ventilation plug 7, to avoid ventilation oil leakage or blockage of the ventilation plug 7 by an oil film caused by the vehicle under intense and complex driving conditions or causing, and to effectively prolong the service life of the ventilation plug 7.

A powertrain according to embodiments of the present disclosure includes a speed reducer according to any one of the above embodiments.

A vehicle according to embodiments of the present disclosure includes a powertrain according to the above embodiments or a speed reducer according to any one of the above embodiments.

In the description of the present disclosure, it should be understood that the orientation or position relationship indicated by the terms "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial" and "circumferential" and the like, is based on the orientation or position relationship shown in the accompanying drawings, which is only for the convenience of describing the present disclosure and simplifying the description, and does not indicate or imply that the referred device or element must have a specific orientation, and be constructed and operated in a specific orientation, so it cannot be understood as a limitation of the present disclosure.

In addition, the terms "first" and "second" are only used for purpose of description, and cannot be understood as indicating or implying relative importance or implicitly indicating the number of indicated technical features. Therefore, the feature defined as "first" or "second" may explicitly or implicitly include at least one such feature. In the description of the present disclosure, "a plurality of" means at least two, such as two, three, etc., unless otherwise specifically defined.

In the present disclosure, unless otherwise expressly defined, terms such as "install/mount", "interconnect", "connect", "fix" shall be understood broadly, and may be, for example, fixed connections, detachable connections, or integral connections; may also be mechanical or electrical connections or intercommunication; may also be direct connections or indirect connections via intervening media; may also be inner communications or interactions of two elements, unless otherwise specifically defined. For those skilled in the art, the specific meaning of the above terms in the present disclosure can be understood according to the specific situations.

In the present disclosure, unless otherwise expressly defined, the first feature "below", "under", "on bottom of", "above", "on", or "on top of" a second feature may include an embodiment in which the first feature is in direct contact with the second feature, or the first feature is in indirect contact with the second feature through an intermediate media. And, the first feature "above", "on", or "on top of" a second feature may include an embodiment in which the first feature is right or obliquely "above", "on", or "on top of" the second feature, or just means that the first feature is at a height higher than that of the second feature. A first feature "below", "under", or "on bottom of" a second feature may include an embodiment in which the first feature is right or obliquely "below", "under", or "on bottom of" the second feature, or just means that the first feature is at a height lower than that of the second feature.

In the description of the present disclosure, terms such as "an embodiment", "some embodiments", "an example", "a specific example" or "some examples" means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present invention. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

A speed reducer according to embodiments of the present disclosure includes a housing, a partition plate, and a reduction assembly. The housing defines a chamber and an oil passage. The partition plate is arranged in the housing to separate the chamber into a gear chamber and an oil chamber. The reduction assembly is arranged in the gear chamber. The oil passage has an inlet in communication with the oil chamber and an outlet in communication with the gear chamber. The outlet of the oil passage faces towards the reduction assembly to lubricate the reduction assembly.

In some embodiments, the reduction assembly includes an input component, a transmission component and an output component; the input component, the transmission component, and the output component are arranged at intervals in a length direction of the housing; and the oil passage includes a main oil passage and a plurality of branch oil passages, and the plurality of branch oil passages has inlets in communication with the main oil passage and outlets respectively facing towards the input component, the transmission component, and the output component to deliver the lubricating oil to the reduction assembly.

In some embodiments, the reduction assembly includes the input component, the input component includes an input shaft and two input bearings, the two input bearings are sleeved on the input shaft, and the two input bearings are respectively located at two ends of the input shaft; and the branch oil passages include a first branch, and the first branch has an outlet facing towards the two input bearings.

In some embodiments, the transmission component includes a transmission shaft, a first transmission gear and two transmission bearings, the two transmission bearings and the first transmission gear are sleeved on the transmission shaft and the two transmission bearings are respectively located at two ends of the transmission shaft, the first transmission gear is located between the two transmission bearings, the input component includes an input gear, and the input gear is engaged with the first transmission gear; and the branch oil passages further include a second branch and a third branch, the second branch has an outlet facing towards the input gear, and the third branch has an outlet facing towards the two transmission bearings.

In some embodiments, the output component includes an output shaft, an output gear, and two output bearings, the two output bearings and the output gear are sleeved on the output shaft, the two output bearings are respectively located at two ends of the output shaft, and the output gear is located between the two output bearings, the transmission component further includes a second transmission gear, and the output gear is engaged with the second transmission gear; and the branch oil passages further include a fourth branch and a fifth branch, fourth branch has an outlet facing towards the two output bearings, and the fifth branch has an outlet facing towards the output gear.

In some embodiments, the speed reducer further includes an oil scavenge pump arranged in the oil chamber, the housing further defines an oil collection chamber, the partition plate defines an oil discharge port, and the oil collection chamber has an inlet in communication with the oil discharge port and an outlet in communication with the oil scavenge pump.

In some embodiments, the speed reducer further includes an oil supply pump, an oil cooler, and a filter connected in sequence, the oil supply pump has an outlet in communication with the main oil passage and an inlet in communication with the oil chamber.

In some embodiments, the speed reducer further includes a ventilation plug connected to the housing, the ventilation plug is located in the oil chamber, and the ventilation plug has an installation height greater than a liquid level height inside the oil chamber.

A powertrain according to embodiments of the present disclosure includes a speed reducer according to any one of the above embodiments.

A vehicle according to embodiments of the present disclosure includes a powertrain according to the above embodiments or a speed reducer according to any one of the above embodiments.

Although the embodiments of the present disclosure have been shown and described above, it can be understood that the above embodiments are illustrative and shall not be understood as limitation to the present disclosure, and changes, modifications, alternatives, and variations can be made in the above embodiments within the scope of the present disclosure by those skilled in the art.

What is claimed is:

1. A speed reducer, comprising:
   a housing defining a chamber and an oil passage;
   a partition plate arranged in the housing to separate the chamber into a gear chamber and an oil chamber; and
   a reduction assembly arranged in the gear chamber, the oil passage having an inlet in communication with the oil chamber and an outlet in communication with the gear chamber, the outlet of the oil passage facing towards the reduction assembly to lubricate the reduction assembly,
   wherein the reduction assembly comprises an input component, a transmission component and an output component, and the input component, the transmission component and the output component are arranged at intervals in a length direction of the housing; and
   the oil passage comprises a main oil passage and a plurality of branch oil passages, and the plurality of branch oil passages has inlets in communication with the main oil passage and outlets respectively facing towards the input component, the transmission component and the output component to deliver lubricating oil to the reduction assembly;
   wherein the input component comprises an input shaft and two input bearings, and the two input bearings are sleeved on the input shaft and respectively located at two ends of the input shaft; and
   the plurality of branch oil passages comprises a first branch, and the first branch has an outlet facing towards the two input bearings; and
   wherein the output component comprises an output shaft, an output gear and two output bearings; the two output bearings and the output gear are sleeved on the output shaft, the two output bearings are respectively located at two ends of the output shaft, and the output gear is located between the two output bearings; the transmission component further comprises an second transmission gear, and the output gear is engaged with the second transmission gear; and the plurality of branch oil passages further comprises a fourth branch and a fifth branch, the fourth branch has an outlet facing towards the two output bearings, and the fifth branch has an outlet facing towards the output gear.

2. The speed reducer according to claim 1, wherein the gear chamber is located above the oil chamber.

3. The speed reducer according to claim 1, wherein the housing comprises two detachable sub-housings, each of the two sub-housings defines a groove, and the grooves in the two sub-housings enclose the oil passage.

4. The speed reducer according to claim 1, wherein the first branch located at a first end of the input shaft sprays the lubrication oil towards the input bearing located at the first end of the input shaft, and the first branch located at a second end of the input shaft sprays the lubrication oil towards the input bearing located at the second end of the input shaft.

5. The speed reducer according to claim 1, wherein the transmission component comprises a transmission shaft, a first transmission gear and two transmission bearings; the two transmission bearings and the first transmission gear are sleeved on the transmission shaft, the two transmission bearings are respectively located at two ends of the transmission shaft, and the first transmission gear is located between the two transmission bearings; the input component comprises an input gear, and the input gear is engaged with the first transmission gear; and the plurality of branch oil passages further comprises a second branch and a third branch, the second branch has an outlet facing towards the input gear, and the third branch has an outlet facing towards the two transmission bearings.

6. The speed reducer according to claim 5, wherein the transmission shaft and the input shaft are arranged in parallel.

7. The speed reducer according to claim 5, wherein the third branch located at a first end of the transmission shaft sprays the lubrication oil towards the transmission bearing located at the first end of the transmission shaft, and the third branch located at a second end of the transmission shaft sprays the lubrication oil towards the transmission bearing located at the second end of the transmission shaft.

8. The speed reducer according to claim 1, wherein the output shaft and the input shaft are arranged in parallel.

9. The speed reducer according to claim 1, wherein the fourth branch located at a first end of the output shaft sprays the lubrication oil towards the output bearing located at the first end of the output shaft, and the fourth branch located at a second end of the output shaft sprays the lubrication oil towards the output bearing located at the second end of the output shaft.

10. The speed reducer according to claim 1, further comprising an oil scavenge pump arranged in the oil chamber, wherein the housing further defines an oil collection chamber, the partition plate defines an oil discharge port, and the oil collection chamber has an inlet in communication with the oil discharge port and an outlet in communication with the oil scavenge pump.

11. The speed reducer according to claim 10, further comprising a ventilation plug connected to the housing, wherein the ventilation plug is located in the oil chamber, and the ventilation plug has an installation height greater than a liquid level height inside the oil chamber.

12. The speed reducer according to claim 11, wherein the ventilation plug is located above the oil chamber, and the ventilation plug has a lower end extending into the oil chamber.

13. A powertrain, comprising:
a speed reducer, comprising:
  a housing defining a chamber and an oil passage;
  a partition plate arranged in the housing to separate the chamber into a gear chamber and an oil chamber; and
  a reduction assembly arranged in the gear chamber, the oil passage having an inlet in communication with the oil chamber and an outlet in communication with the gear chamber, the outlet of the oil passage facing towards the reduction assembly to lubricate the reduction assembly,
  wherein the reduction assembly comprises an input component, a transmission component and an output component, and the input component, the transmission component and the output component are arranged at intervals in a length direction of the housing; and
  the oil passage comprises a main oil passage and a plurality of branch oil passages, and the plurality of branch oil passages has inlets in communication with the main oil passage and outlets respectively facing towards the input component, the transmission component and the output component to deliver lubricating oil to the reduction assembly;
  wherein the input component comprises an input shaft and two input bearings, and the two input bearings are sleeved on the input shaft and respectively located at two ends of the input shaft; and
  the plurality of branch oil passages comprises a first branch, and the first branch has an outlet facing towards the two input bearings; and
  wherein the output component comprises an output shaft, an output gear and two output bearings; the two output bearings and the output gear are sleeved on the output shaft, the two output bearings are respectively located at two ends of the output shaft, and the output gear is located between the two output bearings; the transmission component further comprises an second transmission gear, and the output gear is engaged with the second transmission gear; and
  the plurality of branch oil passages further comprises a fourth branch and a fifth branch, the fourth branch has an outlet facing towards the two output bearings, and the fifth branch has an outlet facing towards the output gear.

14. A vehicle, comprising:
a speed reducer, comprising:
  a housing defining a chamber and an oil passage;
  a partition plate arranged in the housing to separate the chamber into a gear chamber and an oil chamber; and
a reduction assembly arranged in the gear chamber, the oil passage having an inlet in communication with the oil chamber and an outlet in communication with the gear chamber, the outlet of the oil passage facing towards the reduction assembly to lubricate the reduction assembly,
wherein the reduction assembly comprises an input component, a transmission component and an output component, and the input component, the transmission component and the output component are arranged at intervals in a length direction of the housing; and
the oil passage comprises a main oil passage and a plurality of branch oil passages, and the plurality of branch oil passages has inlets in communication with the main oil passage and outlets respectively facing towards the input component, the transmission component and the output component to deliver lubricating oil to the reduction assembly;

wherein the input component comprises an input shaft and two input bearings, and the two input bearings are sleeved on the input shaft and respectively located at two ends of the input shaft; and the plurality of branch oil passages comprises a first branch, and the first branch has an outlet facing towards the two input bearings; and wherein the output component comprises an output shaft, an output gear and two output bearings; the two output bearings and the output gear are sleeved on the output shaft, the two output bearings are respectively located at two ends of the output shaft, and the output gear is located between the two output bearings; the transmission component further comprises an second transmission gear, and the output gear is engaged with the second transmission gear; and the plurality of branch oil passages further comprises a fourth branch and a fifth branch, the fourth branch has an outlet facing towards the two output bearings, and the fifth branch has an outlet facing towards the output gear.

* * * * *